United States Patent [19]

Lax et al.

[11] Patent Number: 4,663,623
[45] Date of Patent: May 5, 1987

[54] DECODING ARRANGEMENTS FOR SYNCHRONOUS RECEIVERS

[75] Inventors: Alexander P. Lax, London; William R. Barker, Basingstoke, both of England

[73] Assignee: Multitone Electronics plc, London, England

[21] Appl. No.: 637,439

[22] Filed: Aug. 3, 1984

[30] Foreign Application Priority Data

Aug. 3, 1983 [GB] United Kingdom ................ 8320979

[51] Int. Cl.⁴ .......................... H04Q 7/00; H04B 1/16
[52] U.S. Cl. ................................ 340/825.44; 455/343
[58] Field of Search .................... 340/825.44; 455/32, 455/343, 228

[56] References Cited

U.S. PATENT DOCUMENTS

| | | | |
|---|---|---|---|
| 4,353,065 | 10/1982 | Mori | 340/825.44 |
| 4,437,095 | 3/1984 | Akahori et al. | 340/825.44 |
| 4,479,261 | 10/1984 | Oda | 455/228 |
| 4,506,386 | 3/1985 | Ichikawa | 455/228 |
| 4,523,332 | 6/1985 | Mori | 455/228 |

FOREIGN PATENT DOCUMENTS 808461 4/1959 United Kingdom .
852863 11/1960 United Kingdom .

Primary Examiner—Donald J. Yusko
Attorney, Agent, or Firm—Renner, Otto, Boisselle & Lyon

[57] ABSTRACT

In a decoder suitable for use in a paging receiver of the type responsive to a transmission which includes a preamble sequence followed by batches each containing a synchronization word followed by a plurality of address and/or message words, the decoder is operative to detect a single synchronization word. Thereafter, the decoder is powered up to search in its specific frame in each batch by means of a clock which has been synchronized with the transmission and which provides the timing for searching in the specific frame of all subsequent batches.

The clock may have coarse and fine modes of timing control, the coarse mode being applicable when initial bit synchronization is being attained, and the fine mode being applied subsequently to reduce the risk of the clock drifting out of synchronization.

10 Claims, 9 Drawing Figures

DECODING ARRANGEMENTS FOR SYNCHRONOUS RECEIVERS

This invention relates to decoding arrangements. More particularly, but not exclusively, the invention relates to decoding arrangements for use in paging receivers or pagers of a radio-paging system.

In radio-paging systems, in particular in so-called "wide-area" radio-paging systems that cover areas at least equal in size to part of a city, it is a common practice to send a transmission that comprises a series of predetermined address signals intended for different paging receivers (pagers), which address signals are interspersed with synchronisation signals for the pagers. Each pager will detect a transmission and monitor it to see whether it contains an address signal corresponding to its particular address. Each transmission commences with a preamble signal, which causes all the pagers to begin a process of setting themselves up to look for an address signal. Since it is desirable to make pagers as small as possible, in the interests of portability, a very important consideration is that of battery economy. It is common practice at present for a pager to be automatically switched on at regular intervals so as to seek the preamble signal. If this is found, the pager detects the subsequent synchronisation signal whereupon the receiver/demodulator part of the pager is switched off for a period lasting until the address signal for the respective user is expected. At that point, the pager is switched on again to permit the address detection to be made. The "switched-off" period of the pager following the synchronisation detection provides some battery saving, as does the repeated preamble searching operation in which the pager is switched off between the search intervals.

According to the present invention there is provided a decoding arrangement for decoding a transmission including batches of words, each batch comprising respective synchronisation words followed by pluralities of code words including at least one address words, the arrangement comprising;

transmission detection means operative to detect receipt of a transmission;

synchronisation word detection means operative to detect a said synchronisation word;

address detection means operative to detect a said address word; and synchronisation/control means including a clock, the synchronisation/control means being responsive to detection of a single said synchronisation word to put the clock into word synchronisation with the transmission, subsequent synchronisation words not being detected, said synchronisation/control means including power control means responsive to the clock alternately to inhibit and enable reception of the transmission so that reception is enabled at a predetermined time within each batch to allow said address detection means to detect said address word at said predetermined time, said synchronisation/control means being responsive to an indication by the transmission detection means that a transmission is no longer being received to put the decoding arrangement into a condition ready to receive another transmission.

In a preferred decoding arrangement, the synchronisation control means is responsive to the detection by the transmission detection means of receipt of a transmission and to the subsequent detection by the synchronisation word detection means of a synchronisation word to cause the address detection means to become operative to detect said predetermined address word within the predetermined frame of the batch immediately following said synchronisation word. The control means is further operative in the preferred arrangement, in the event of said predetermined address word not being detected within the predetermined frame of said batch, to cause the address detection means to continue looking for said predetermined address word in said predetermined frame of a subsequent batch or batches, provided that the transmission detection means indicates that the transmission is still being received. In other words, the preferred arrangement detects the synchronisation word once, in order to achieve synchronisation, and thereafter continues to look for the predetermined address words in the appropriate frame of succeeding batches for so long as the transmission detection means indicates that the current transmission is being received.

It is, therefore, possible to effect a significant extra degree of battery economy, since once the single synchronisation word has been detected and the clock put into word synchronisation with the transmission, the pager receiver section need only be switched as in the predetermined frames, once per batch, so as to look for the predetermined address words.

The transmission detection means is preferably operative to detect the preamble at the start of each transmission. Alternatively, it may be operative to detect receipt of the transmission by detecting the presence of any data signal, for example, by determining the rate of frequency of zero-crossings or transitions of an input signal. If the input signal is due to random noise, i.e. if a transmission is absent, the rate or frequency of transitions in either sense (i.e. positive-going or negative-going) will on average be approximately equal to half the bandwidth of the channel over which the transmission is received. If this bandwidth is sufficiently larger than the transition rate of the transmission, it can readily be determined whether or not a transmission is being received by monitoring whether the transition rate is or is not below a threshold level which is above the transition rate of the transmission and below that expected when noise only is present. See UK Patent Specifications Nos. 808 461 and 852 863 for further details of how such discrimination between noise and data may be achieved.

With such an arrangement, the decoding arrangement can respond to a transmission even after the preamble signal has terminated and therefore detect any subsequent address signal in that transmission that is intended to be decoded by that decoder arrangement.

The preferred arrangement therefore has the advantage of providing extra battery economy by needing to receive the transmission during only one frame per batch, once the first synchronisation word has been detected.

A further advantage of this arrangement is that, if any subsequent synchronisation words in the transmission contain errors, or if the reception conditions are temporarily inadequate, such as might result from screening by a vehicle or other moving object, this will not effect reception of the address words (assuming these are adequate for reception), since such reception is dependent only on the first synchronisation word to be detected. It follows that the arrangement is capable of receiving effectively even if more than one synchronisation word is not detectable in the transmission.

A still further advantage is that it becomes possible to provide a "timed" alert signal function. Pagers are generally provided with an alert function, such as an audible "beep" alarm, so as to inform the user that a message has been received. A transducer and associated amplifying circuitry for providing this function can interfere with the demodulation part of the pager, particularly in a direct conversion type of receiver. The fact that a pager according to the present invention is switched on at regular intervals (once per batch in the appropriate frame) once it has achieved word synchronisation, means that the periods in between can be used to generate the "beep" sound, and interference between the stages of the pager is prevented.

The invention will now be further described, by way of illustrative and non-limiting example, with reference to the accompanying drawings, in which.

Figure 1:
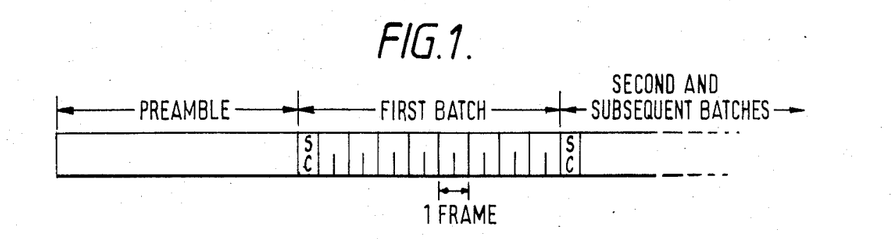
FIG. 1 is a schematic representation of the format of a signal transmitted in the standard British Telecom POCSAG radio-paging system.

FIG. 1 shows the format of a signal transmitted by one or more transmitters in a wide area radio-paging system. The format illustrated is that devised by the British Post Office Code Standardisation Advisory Group (POCSAG). This format is in use in the UK and other countries and widely becoming accepted as an international standard. For fuller details, reference should be made to "A Standard Code for Radio-paging—a Report of the Studies of the British Post Office Code Standardisation Advisory Group (POCSAG)", published 1978 by British Telecom (then part of the British Post Office). For present purposes, it should be noted that the signal format comprises a series of address signals for individual pagers using the system. The series of address signals is assembled in accordance with requests and transmitted as a continuous transmission. The transmission is of digital format and starts with a preamble which has a duration of at least 576 bits, equivalent to the duration of one batch (see below) and at least one codeword (see below). The preamble is followed by one or more batches of codewords. Each batch begins with a synchronisation codeword (SC) and is followed by eight "frames" each having a duration equivalent to two codewords. (Thus, each batch has a duration equivalent to one synchronisation codeword plus eight frames, namely seventeen codewords). Transmission of the signal ceases at the end of a batch.

In more detail, the preamble comprises a pattern of reversals, i.e. the bits 101010 . . . , repeated for a period of at least 576 bits. The intention of the preamble is to permit the pagers to attain bit synchronisation and to prepare them to acquire word synchronisation. Codewords are then transmitted in batches, each of which comprises a synchronisation codeword SC followed by eight frames each containing two codewords, namely an address codeword and a message codeword. The pagers of the system are each allocated a specific one of the eight frames and will examine only address codewords in that frame. Each pager has one or more predetermined address codewords stored therein and such address codeword(s) will only be transmitted in the frame allocated to the associated pager.

If only an audible alert facility were required for the pagers, the transmission of the address codeword only for that pager would suffice. However, as indicated above, the POCSAG system includes provision for the transmission also of messages in the form of message codewords that can indicate a numeric or alphanumeric message which can be displayed by the pager. Message codewords for any pager may be transmitted in any frame, but will follow directly the associated address codeword. A message may comprise any number of codewords transmitted consecutively and may embrace one or more batches, but the synchronisation codeword SC must not be displaced by message codewords. Message termination is indicated by the next address codeword or by an "idle" codeword. In any frame, an idle codeword is transmitted whenever there is no address codeword or message codeword to be transmitted.

Each synchronisation codeword is of a standard bit pattern and all pagers are capable of recognising its receipt. Each address codeword is specific only to one particular pager and comprises a pattern of bits denoting the address together with parity check bits. Message codewords similarly comprise a bit pattern together with parity check bits. Address and message codewords commence with respective different flag bits so that they can mutually be distinguished. The framing rules of the code format do not apply to a message and message codewords continue until terminated by the transmission of the next address codeword or idle codeword or end of batch. Each message displaces at least one address codeword or idle codeword and the displaced address codewords will be delayed and transmitted in the next available appropriate frame. Although, therefore, message codewords may continue into the next batch, the normal batch structure will be maintained in that each batch will comprise sixteen codewords preceded by a synchronisation codeword SC.

Pagers designed to function with a POCSAG system can be designed in a variety of ways, provided that they are capable of processing a transmission having the above-described format to detect therefrom a message signal for the associated pager identified by the address of that pager.

Figure 2:
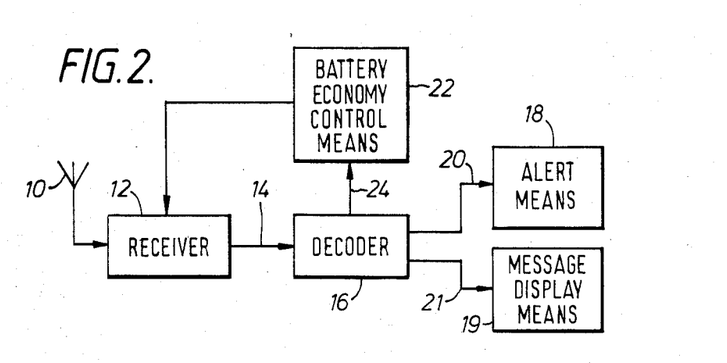
FIG. 2 is a block diagram of the electrical circuitry of a paging receiver or pager designed to respond to a signal in accordance with FIG. 1.

FIG. 2 shows a generalised form of pager capable of responding to a POCSAG format transmission. The pager comprises an aerial 10 connected to a receiver 12 which includes radio frequency (RF) circuitry tuned to the transmission channel employed by the associated transmitter or transmitters and demodulation circuitry for detecting the POCSAG signal. (In this connection, the POCSAG signal is modulated onto a carrier by means of frequency shift keying). The demodulated output of the receiver 12 is fed via a line 14 to a decoder 16. In a manner described below, the decoder 16 detects any address signal and message signal destined for the associated pager and, in response thereto, activates an alert means 18 and a message display means 19 via lines 20 and 21. A battery economy control means 22 is activated by the decoder 16 via a line 24 to disable the receiver 12, when not required, so as to maximise the life of a battery powering the pager.

Figure 3:
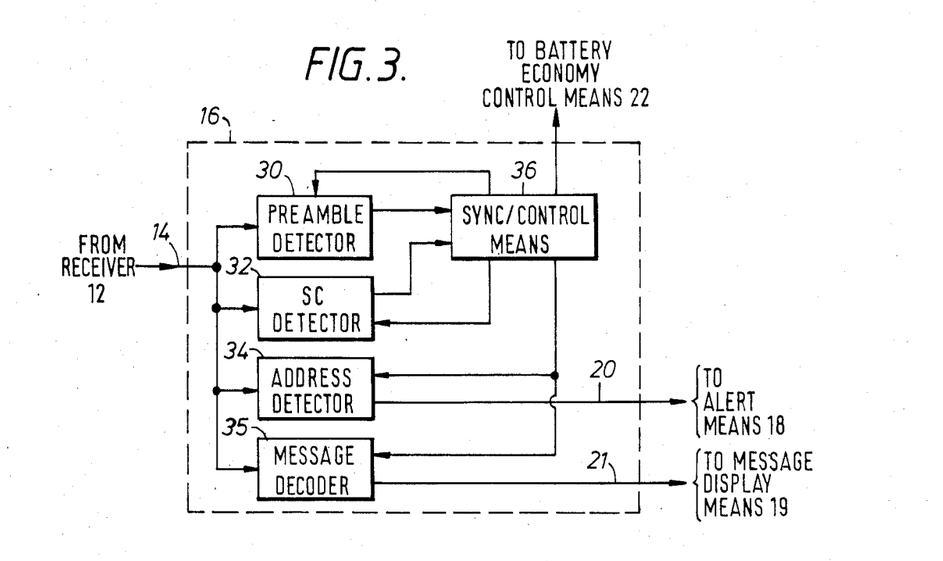
FIG. 3 is a block diagram of a decoding arrangement or decoder of the pager of FIG. 2.

The structure of the decoder 16 is shown in more detail in FIG. 3. As shown in FIG. 3, the decoder 16 comprises a preamble detector 30, a synchronisation codeword (SC) detector 32, an address detector 34 and a message decoder 35, each connected to receive the demodulated output from the receiver 12. The detectors 30, 32 and 34 and the decoder 35 are controlled by a synchronisation/control means 36 and are operative, respectively, to detect the preamble signal of a transmission, synchronisation codewords present in a transmission, the address of the associated pager, when such address is present in the frame of any batch of the transmission allocated to the associated pager, and any message codewords which are transmitted for the associated pager.

The generalised POCSAG receiver of FIGS. 2 and 3 operates in the following manner. Prior to a transmission, the battery economy control means 22 powers down the receiver. At intervals which are slightly shorter than the duration of the preamble signal, the battery economy control means 22 powers up the receiver 12 for a short interval to look for preamble. When preamble is detected, a clock (not shown) in the synchronisation/control means 36 comes into bit synchronisation with the transmission and powering of the receiver 12 is maintained while the synchronisation codeword (SC) detector 32 looks for the first synchronisation codeword SC, namely that commencing the first batch of the transmission. When the detector 32 detects the first synchronisation codeword SC, the synchronisation/control means 36 comes into word synchronisation therewith and causes the battery economy control means 22 to power down the receiver 12 until that frame in the first batch at which any message for the associated pager should arrive. If the frame in question should be the frame immediately following the synchronisation codeword, no power down interval would be provided. When that frame arrives, the address detector 34 looks for the address of the associated pager. If that address is detected and one or more message codewords follow contiguously, the message codeword(s) is/are decoded by the decoder 35 and displayed by the message display means 19. An alert sequence may then be generated by the alert means 18. The decoder 16 keeps looking for the next synchronisation codeword. This process of continually looking for synchronisation codewords and inspecting thereafter the associated frames continues until the transmission ends. The end of the transmission is detected by the pager by the non-detection of a synchronisation codeword SC.

It should be understood that FIGS. 2 and 3 are highly schematic representations of a generalised form of POCSAG receiver in that the various described blocks may in fact be constructed so that at least some of the different parts may share circuitry, in particular when the different parts are not required to function simultaneously.

A pager embodying the invention is of substantially the same configuration as shown in FIGS. 2 and 3, except that, in the detector 16, the preamble detector 30 may be replaced by a data or transmission detector 40 and, as described hereinbelow, the synchronisation codeword detector 32 need respond only to the first synchronisation codeword SC that it receives.

Figure 4:
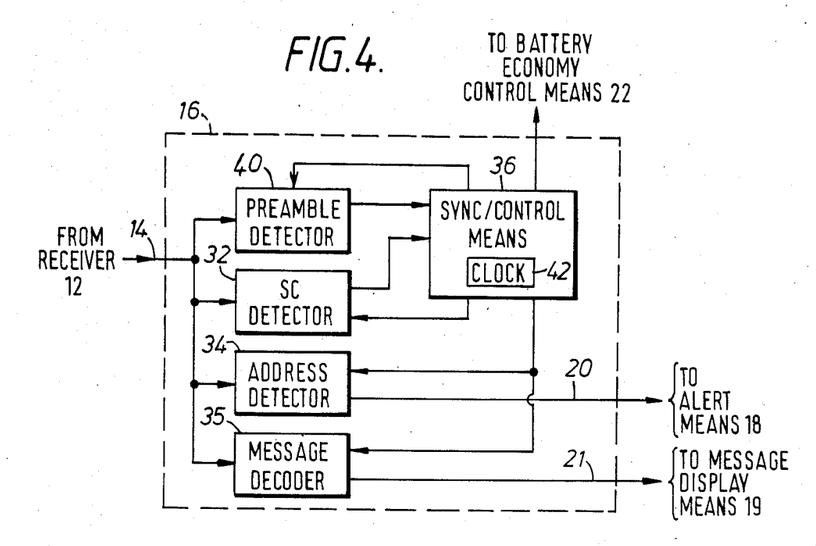
FIG. 4 shows a modification, embodying the present invention, of the decoding arrangement or decoder of FIG. 3.

The operation of the pager embodying the invention will be described in detail hereinbelow with reference to FIGS. 4 to 6. For the moment, suffice it to say that the data detector 40 enables the detection of a transmission at any time during its course, even after the preamble signal is terminated, whereby the pager can commence operation from that point in time. Further, the synchronisation/control means 36 includes a "stiff" clock 42, which is put into word synchronisation when the detector 32 first detects a synchronisation codeword and will thereafter be kept in synchronisation by the bits of the incoming transmission, whereby it does not have to detect subsequent synchronisation codewords.

The data detector 40 is operative to detect data, that is to say to detect the presence of a transmission, and is operative to provide a signal to the synchronisation/control means 36 that indicates either that a transmission is being received or that a transmission is not being received. The data detector 40 may for example be operative to achieve such function by detecting the rate or frequency of zero-crossings or level transitions of the input signal it receives from the receiver 12. In this connection, if the input signal is due to random noise, i.e. if a transmission is absent, the rate or frequency of transitions of the input signal in either sense (i.e. positive-going or negative-going) will on average be approximately equal to half the bandwidth of the channel over which the transmission is received. Provided this bandwidth is sufficiently larger than the transition rate of the transmission, which will generally be the case for POCSAG systems, it can readily be determined whether or not a transmission is being received by monitoring whether the transmission rate is or is not below a threshold level which is above the transition rate of the transmission.

Figure 5:
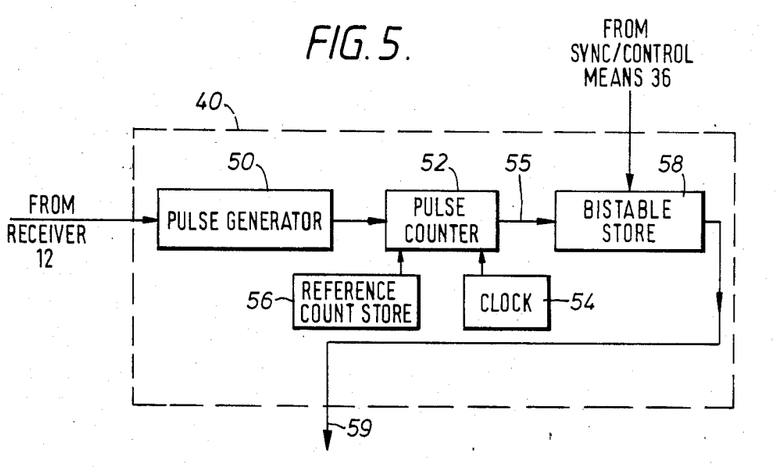
FIG. 5 is a block diagram of a data or transmission detector of the decoder of FIG. 4.

One form of implementation of the data detector 40 is shown in FIG. 5. The input signal from the receiver 12 is passed to a pulse generator 50 which produces a pulse on each level transition or zero-crossing of the signal. These pulses are passed to a pulse counter 52 which counts the number of pulses emanating from the pulse generator 50 during a predetermined period of time determined by an accurate clock 54, which may in practice form part of the synchronisation/control means 36. The output of the pulse counter on a line 55 is a flag which goes "high" or "low" depending on whether the transition rate of the data determined by the pulse counter is above or below a predetermined threshold count stored in a reference count store 56. Under the control of the synchronisation/control means 36, the flag signal on the line 55 can be transferred into and held in a bistable store 58, from which it can be outputted as a flag 59.

A preferred manner of operation of the pager embodying the invention will now be described with reference to a flow diagram set forth in FIG. 6.

Figure 6:
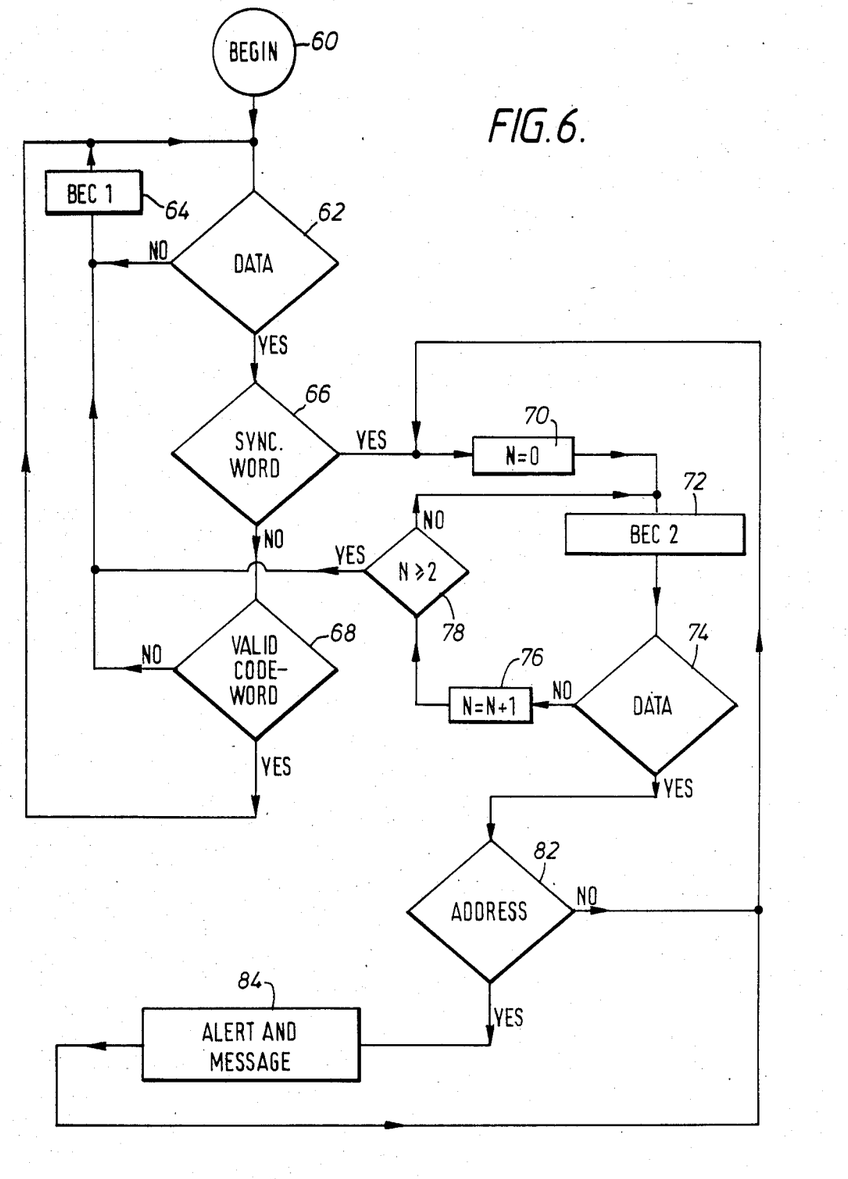
FIG. 6 is a flow diagram illustrating the operation of the decoder of FIG. 4.

The flow diagram of FIG. 6 includes a "begin" block 60 that may correspond to the pager being switched on. At that time the decoder 16 checks the flag 59 (block 62) to determine if data is present. If not, the cycle of operation enters a first battery economy control mode BEC 1 (block 64) in which the battery economy control means 22 only periodically powers up the receiver to look for a transmission. When the receiver is next powered up in this manner the data detector 40 (block 62) indicates whether a transmission is present. If not, the operation returns to the block 64. If a transmission is present the decoder 16 looks for the next synchronisation codeword (block 66). If no synchronisation codeword is detected, the decoder 16 then determines (block 68) if the previous 32-bit code word is likely to have been valid POCSAG data. This can be determined by ensuring that the number of transitions detected in the data detector 40 (block 62) is at least four during a 32-bit period. If the data is not valid, e.g. if only carrier is present, the cycle reverts to the block 64. If valid data is detected, then the cycle returns to the block 62 to look for a synchronisation codeword by means of the data detector 40. When a synchronisation codewode is detected (block 66), the cycle resets a variable N to zero (block 70) and enters a second battery economy mode cycle BEC 2 (block 72) in which the battery economy control means 22 only powers up the receiver at periodic intervals so that it can detect data in its own predetermined frame. When powered up by the block 72, the decoder 16 again checks the flag 79 to determine (block 74) if a transmission is present. If no transmission is detected the variable N is set to one (block 76) and operation returns to the block 72. When the receiver is next powered up, if transmission is still not detected then the variable N is set to two (block 78) and the operation is returned to the block 64.

If data is detected in the block 74, the address detector 34 is used, (block 82) to determine if the pager's address has been transmitted. If its address has not been detected then the variable N is set to zero again (block 70) and the receiver is powered down (block 72) until the next time the pager is powered up. If the pager's address is detected then following messages are decoded if they are present and the specified alert is generated (block 84). Following such address and/or message detection, the operation cycle reverts back to block 72 after setting N to zero again (block 70).

It should be noted that since a "stiff" clock is used in the synchronisation/control means 36, the present arrangement does not have to keep looking for synchronisation codewords so as to keep it in word synchronisation. The end of the transmission is detected by the data detector 40 (block 62 or block 74), not by the absence of any synchronisation codewords. Thus, when the check performed by the block 78 indicates that data is still not being received, the cycle of operation reverts to the block 64.

The pager embodying the invention as described hereinabove can be used in coding systems other than the standard POCSAG coding system described above. Thus, for example, since it need not depend upon the existence of the POCSAG preamble signal to commence operation, it could be used without any modification of substance in a modification of the POCSAG signal in which the preamble is abolished.

An advantage of the pager in accordance with the previously-described embodiment is, as previously explained, that by virtue of the use of a data detector 40 instead of the preamble detector 30 it is possible to pick up a transmission at any point even subsequent to the preamble signal. It would be possible to modify the pager described hereinabove by incorporating both a preamble detector 30 and a data detector 40 and by modifying the test illustrated in block 62 of the flow diagram of FIG. 6 to be a test for preamble rather than data.

Figure 7:
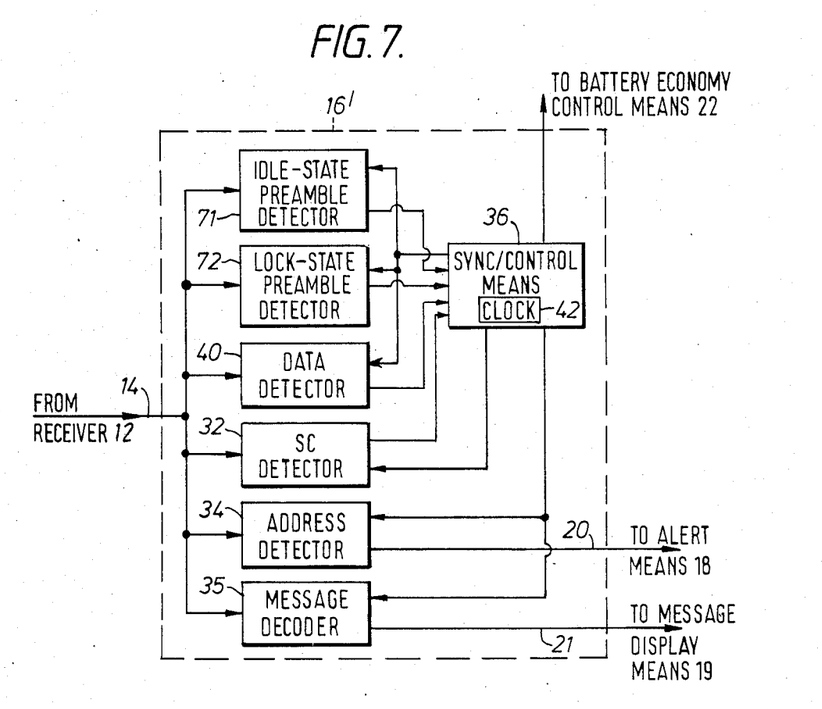
FIG. 7 shows a further modification, embodying the present invention, of the decoding arrangement or decoder of FIG. 3.

FIG. 7 shows a decoder in accordance with another embodiment of the invention. The decoder is in general similar to that of FIG. 4, like reference numerals being used for like features, except that in this case decoder 16' includes two preamble detectors, an idle-state preamble detector 71 and a lock-state preamble detector 72, as well as the data detector 40. The operation of decoder 16' will be described with reference to the flow diagram shown in FIG. 8, which is similar to that of FIG. 6, only the differences being described in detail.

Figure 8:
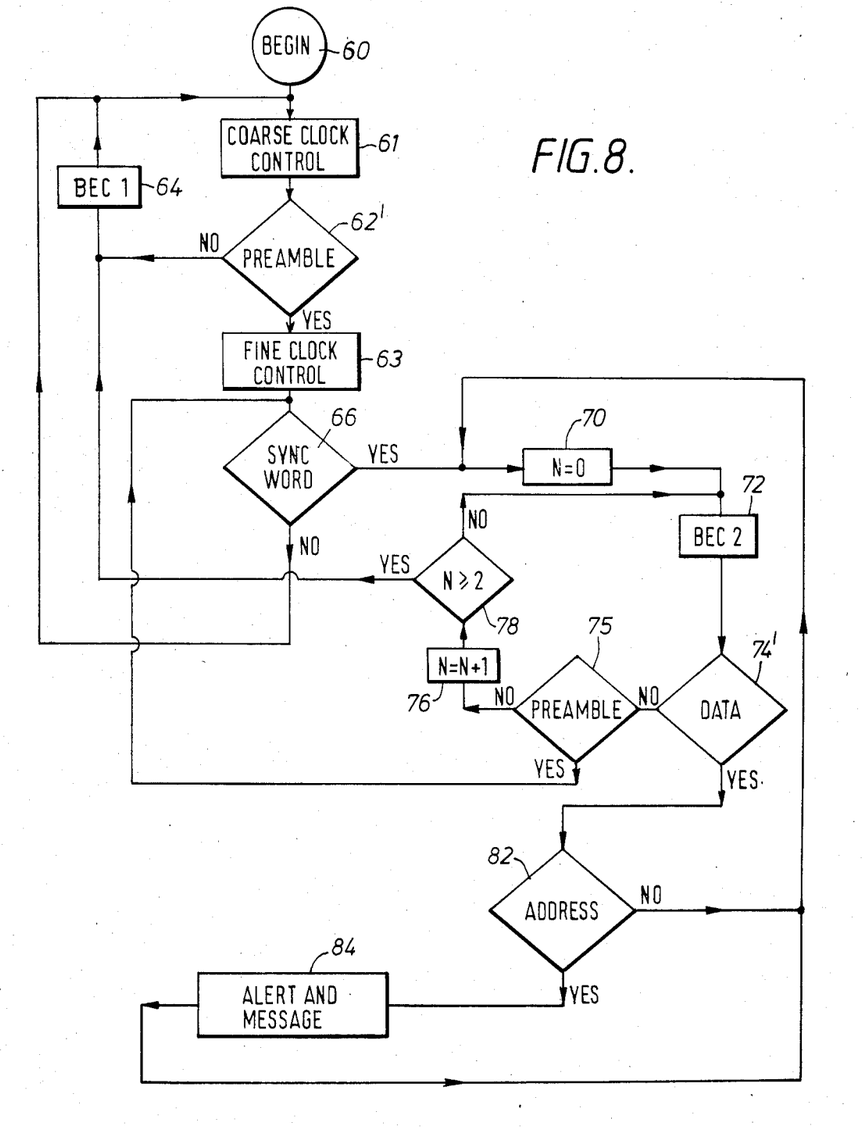
FIG. 8 is a flow diagram illustrating the operation of the decoder of FIG. 7.

Upon switch-on of the pager at "begin" block 60, block 61 initiates a coarse mode of clock control timing. The effect of this is that a phase-lock loop (PLL) circuit, or similar timing control circuit responsible for controlling the clock 42, is able to track any received signals in a coarse manner as to attempt to attain bit synchronisation. If valid data is being received, this coarse control enables such synchronisation to be achieved more rapidly. The idle-state preamble detector 71 checks to determine if preamble is present. If not, the operation is as previously described, returning to the idle state such that the battery economy control means 22 only periodically powers up the receiver to look for a transmission. If preamble is detected, the PLL is set into a fine mode of timing control by block 63. The effect of this is that the PLL tracks the received data in a fine mode of control, in other words the correction applied to the internal clock per data transition is less than in the coarse control mode. This reduces the effect of spurious signals on the clock which might otherwise cause it to drift out of synchronisation. Since the timing for all subsequent address detections is derived only from the first synchronisation word to be detected, it is particularly important that bit and word synchronisation be maintained.

Under conditions when the receiver/demodulator is powered down in the battery economy periods, no corrections are applied to the PLL in either the coarse or fine modes, and corrections are only applied when the receiver/demodulator has been powered up for a sufficient time, in order to allow it to stabilise. In other words, when either of the blocks 64 and 72 have caused such a power down, no corrections are applied and the clock 42 is free running. The reason for this is to minimise the effects of noise on the PLL.

In a practical circuit, a coarse correction factor of $\frac{1}{8}$ bit per transition and a fine correction factor of 1/16 bit per transition have been found to be effective. In certain circumstances, the fine control may be reduced such that no correction is applied; alternatively, more than two modes of correction may be used, or one or more variable rate of correction. In addition, or alternatively, a correction need only be applied once per n transitions (n being greater than one), thus reducing the number of corrections per unit time.

The flow diagram of FIG. 8 also differs from that previously described in that the block 68 of FIG. 6 is omitted. The reason is that since preamble has already been detected (block 62'), it is highly unlikely that signals other than valid POCSAG data are being received which would otherwise prevent the BEC 1 mode being entered.

The operation of data detector block 74' differs from that previously described (block 74, FIG. 6) in that the technique depends on detection of substantially error-free POCSAG code words; accordingly, preamble appears as an invalid code word.

When a new transmission is received and the decoder is in the loop including BEC 2, it is necessary to include another preamble test (block 75) effected by the lock-state preamble detector 72 (FIG. 7) in order to enable the decoder to re-synchronise to the new transmission. If preamble is detected, the decoder returns to block 66 and searches for the next synchronisation word. If no preamble is detected, the normal operation continues as described above.

The operation of data detector block 74' relies on a known method of error correction of BCH coded signals which calculates expected check bits using the received codeword and then compares these calculated check bits with the originally received check bits forming part of the received codeword. The pattern of the differences between the received and calculated check bits is unique for each combination of errors in the received codeword and is independent of the actual correct codeword, up to at least two errors in the first thirty two bits of a POCSAG code word.

By comparing this difference pattern with those stored in a look-up table, or by other means, it would then be possible to determine which of the originally received bits of the codeword were in error. These bits could then be complemented to give a correct codeword. If desired, this corrected codeword may be used subsequently in place of the received incorrect word.

If, after going through the look-up table, or other means, no match for the differences pattern has been found, it can be concluded that the received codeword was not a valid POCSAG codeword within two errors, i.e. that the data was not valid. The rest of the receiver circuitry can then act on this information accordingly, in other words a 'no' decision has been made by block 74'.

To reduce susceptibility to bursts of noise or similar, it is possible to check following codewords and not to decide that the data was invalid until a predetermined number of corrupted words has been received.

Figure 9:
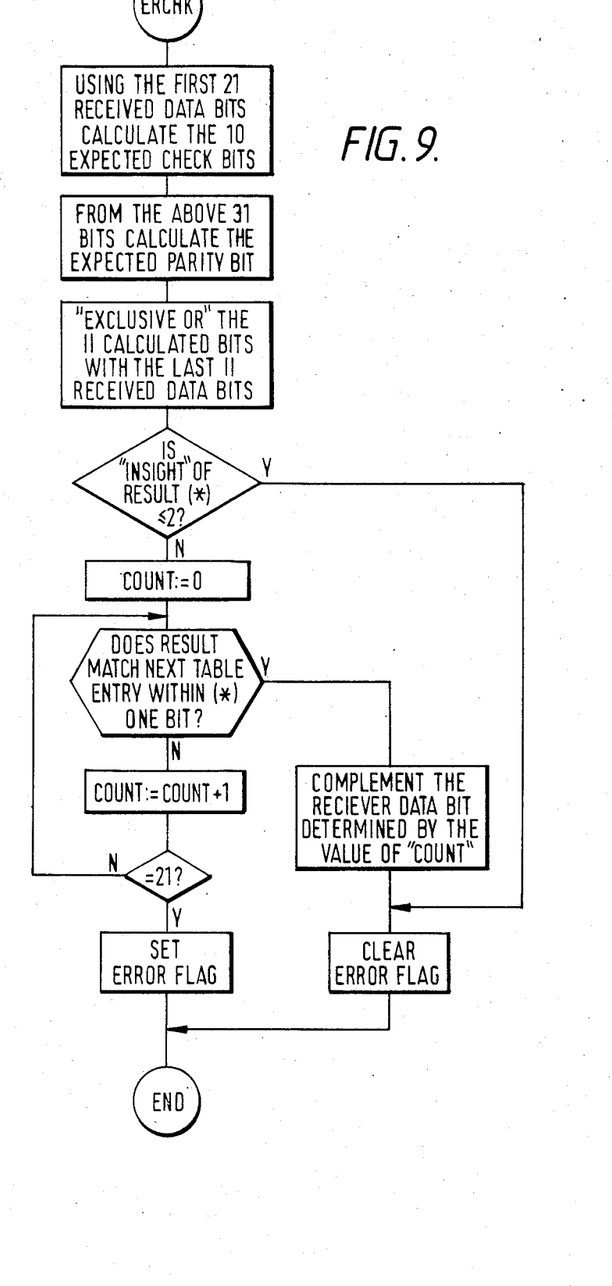
FIG. 9 is a flow diagram of a sub-routine which can be used for data detection in the decoder of FIG. 7.

FIG. 9 shows a flow diagram of an error checking sub-routine which relies on the previously-described method to provide suitable data detection. As shown, this routine will correct 2 bit errors provided that at least one occurs in the check bits. The two decision boxes marked with an asterisk would be modified if only single bit error correction were required. The operation as shown in the flow diagram is believed to be self-explanatory; if the "set error flag" step is reached, then this corresponds to a "no" decision from the data detection block 74' in FIG. 8, and if the "clear error flag" step is reached, this corresponds to a "yes" decision in respect of data detection.

In the flow diagrams of FIGS. 6 and 8, the address detection block 82 is shown following the data detection block 74 of 74'. Depending upon the realisation of these two blocks, it does not follow that these operations are necessarily in this sequence. They may for example be performed in parallel, or the address detection could even precede the data detection.

Embodiments of the invention provide the previously-mentioned advantages of better battery economy and ability to receive address codewords even in the presence of indecipherable synchronisation words, by virtue of the single initial synchronisation word detection. Since the battery economy circuit only needs to switch on the receiver at the specific frame within each batch, there are regular intervals which are of the same length regardless of the frame allocated to the receiver. It is thus possible to arrange for an alert to be generated within these regular intervals. Since the intervals are independent of the frame allocation, the alert patterns can be identically timed for all pagers with respect to their specific frames. This cannot be achieved in the conventional decoder in which each address detection needs to be preceded by a synchronisation word detection, and therefore power down periods are completely dependent on the specific frame allocated to each individual pager.

In the event that preamble is detected (in block 75) while the alert is being generated, in order to maintain the alert timing pattern, the detection of the synchronisation word may be delayed until the alert generation has been concluded.

Although various advantageous features have been described in relation to specific embodiments of the invention, it should be noted that these features may be incorporated in other embodiments as described.

We claim:

1. In a decoding arrangement for decoding a transmission including batches of words, each batch comprising a respective synchronisation word followed by a plurality of code words, the arrangement comprising:
   receiver means for receiving said transmission;
   power control means for controlling supply of power to said receiver means;
   transmission detection means operative to detect receipt of said transmission by said receiver means;
   synchronisation word detection means operative to detect one of said synchronisation words;
   address detection means operative to detect an address word included in one of said pluralities of code words; and
   synchronisation-control means operative alternately to activate and deactivate said power control means respectively to enable and inhibit reception of said transmission by said receiver means so that reception is enabled at a predetermined time within each batch to allow said address detection means to detect said address word at said predetermined time;
   the improvement wherein:
   said synchronisation-control means includes a clock and is responsive to detection by said synchronisation word detection means of a single one of said synchronisation words to put said clock into word synchronisation with said transmission, and to inhibit said synchronisation word detection means from detecting any further synchronisation words in the same transmission;
   said synchronisation-control means is operative to derive each of said predetermined times at which reception is enabled from the time at which said single synchronisation word was detected by said synchronisation word detection means; and
   said synchronisation-control means is responsive to an indication by said transmission detection means that said transmission is no longer being received by said receiver means to put said decoding arrangement into a condition ready to receive another said transmission.

2. A decoding arrangement according to claim 1, wherein the synchronisation-control means includes timing correction means operative to apply a variable timing correction factor to the clock, the timing correction means being responsive to the transmission detection means detecting receipt of a transmission to reduce the correction factor applied to the clock.

3. A decoding arrangement according to claim 2, wherein the timing correction means is operative in first and second modes respectively applying different correction factors.

4. A decoding arrangement according to claim 2, wherein the transmitted batches of words include level transitions, and the timing correction means applies the correction factor once only per n level transitions, n being greater than one.

5. A decoding arrangement according to claim 1, wherein the transmission detection means comprises at least one preamble detector operative to detect a preamble sequence preceding the batches of words in the transmission.

6. A decoding arrangement according to claim 1, wherein the transmission detection means comprises a data detector operative to detect the code words in the transmission.

7. A decoding arrangement according to claim 6, wherein the code words comprise data bits and check bits, and the data detector comprises means operative to calculate expected check bits of the code words from the data bits thereof, and to compare the expected check bits with those in the received code words.

8. A decoding arrangement according to claim 7, wherein the means operative to calculate and to compare comprises means to effect a comparison between the expected and received check bits to produce a difference pattern and the transmitted code words have the property that the difference pattern produced is independent of the particular correct code word.

9. A decoding arrangement according to claim 1, comprising alert generating means responsive to detection by the address detection means to generate an alert in a pattern so that the alert is generated only when the power control means is inhibiting reception of the transmission, while still maintaining a regular pattern.

10. A decoding arrangement according to claim 1, wherein the transmission detection means comprises a preamble detector means and a data detector means, the data detector means being operative to detect the code words in the transmission, and in the absence of such detection the preamble detector means being operative to detect a preamble sequence preceding the batches of words in the transmission, the synchronisation word detection means being enabled to detect a subsequent synchronisation word if preamble has been detected by said preamble detector means.

* * * * *